(12) United States Patent
Hine

(10) Patent No.: US 8,944,866 B2
(45) Date of Patent: Feb. 3, 2015

(54) WAVE-POWERED ENDURANCE EXTENSION MODULE FOR UNMANNED UNDERWATER VEHICLES

(71) Applicant: Liquid Robotics Inc., Sunnyvale, CA (US)

(72) Inventor: Roger G. Hine, Menlo Park, CA (US)

(73) Assignee: Liquid Robotics, Inc., Sunnyvale, CA (US)

( * ) Notice: Subject to any disclaimer, the term of this patent is extended or adjusted under 35 U.S.C. 154(b) by 110 days.

(21) Appl. No.: 13/621,803

(22) Filed: Sep. 17, 2012

(65) Prior Publication Data

US 2013/0068153 A1    Mar. 21, 2013

Related U.S. Application Data

(60) Provisional application No. 61/585,229, filed on Jan. 10, 2012, provisional application No. 61/535,116, filed on Sep. 15, 2011, provisional application No. 61/535,322, filed on Sep. 15, 2011.

(51) Int. Cl.
*B63H 19/02* (2006.01)
*B63G 8/08* (2006.01)

(52) U.S. Cl.
CPC ... *B63G 8/08* (2013.01); *Y02T 70/59* (2013.01)
USPC .............................. 440/9; 114/336

(58) Field of Classification Search
USPC ....................... 440/9; 114/336, 313
IPC ............................ B63H 19/02; B63G 8/00,8/42
See application file for complete search history.

(56) References Cited

U.S. PATENT DOCUMENTS

| 986,627 A | 3/1911 | Fischer |
| 1,067,113 A | 7/1913 | Heyen |
| 1,315,267 A | 9/1919 | White |
| 2,170,914 A | 8/1939 | Rummler |
| 2,520,804 A | 8/1950 | Hollar |

(Continued)

FOREIGN PATENT DOCUMENTS

| BE | 570555 A | 9/1958 |
| CN | 1280936 A | 1/2001 |

(Continued)

OTHER PUBLICATIONS

Ageev. M., "Application of solar and wave energies for long-range autonomous vehicles", Advanced Robotics, 2002, p. 43-55, vol. 16, No. 1.

(Continued)

*Primary Examiner* — Stephen Avila
(74) *Attorney, Agent, or Firm* — Kilpatrick Townsend & Stockton LLP

(57) ABSTRACT

An Endurance Extension Module (EXM) for powering an Unmanned Underwater Vehicle. The EXM converts wave motion to locomotive thrust, towing the UUV from point to point or keeping it in place against an opposing current. The EXM may also supply the UUV with electricity for driving an electric motor or powering on-board electronics. The EXM can be refracted onto the UUV when not in use to minimize drag, or it can release the UUV as prologue to a subsequent rendezvous. The EXM-UUV combinations of this invention allow extended autonomous missions over wider territory for purposes such as surveying, monitoring conditions, or delivering cargo.

5 Claims, 5 Drawing Sheets

(56) References Cited

U.S. PATENT DOCUMENTS

| | | | |
|---|---|---|---|
| 2,668,512 A | 2/1954 | Klas | |
| 3,132,322 A | 5/1964 | Maes | |
| 3,297,814 A | 1/1967 | McClean et al. | |
| 3,312,186 A | 4/1967 | Litshiem | |
| 3,352,274 A | 11/1967 | Clakins | |
| 3,443,020 A | 5/1969 | Loshigian | |
| 3,453,981 A | 7/1969 | Gause | |
| 3,508,516 A | 4/1970 | Root | |
| 3,613,627 A | 10/1971 | Kennedy | |
| 3,760,441 A | 9/1973 | Handelman | |
| 3,828,380 A | 8/1974 | Lebovits et al. | |
| 3,845,733 A | 11/1974 | Jackman | |
| 3,859,949 A | 1/1975 | Toussaint et al. | |
| 3,860,900 A | 1/1975 | Scudder | |
| 3,872,819 A | 3/1975 | Pickens | |
| 3,889,045 A | 6/1975 | Logsdon | |
| 3,928,967 A | 12/1975 | Salter | |
| 3,962,982 A | 6/1976 | Pickens et al. | |
| 3,978,813 A | 9/1976 | Pickens et al. | |
| 4,134,023 A | 1/1979 | Salter | |
| 4,224,707 A | 9/1980 | Mariani | |
| 4,332,571 A | 6/1982 | Jakobsen | |
| 4,371,347 A | 2/1983 | Jakobsen | |
| 4,383,725 A | 5/1983 | Bogese et al. | |
| 4,389,843 A * | 6/1983 | Lamberti | 60/507 |
| 4,598,547 A | 7/1986 | Danihel | |
| 4,610,212 A | 9/1986 | Petrovich | |
| 4,638,588 A | 1/1987 | Abadie | |
| 4,673,363 A | 6/1987 | Hudson et al. | |
| 4,684,350 A | 8/1987 | DeLima | |
| 4,684,359 A | 8/1987 | Herrington | |
| 4,726,314 A | 2/1988 | Ayers | |
| 4,763,126 A | 8/1988 | Jawetz | |
| 4,842,560 A * | 6/1989 | Lee | 440/9 |
| 4,896,620 A | 1/1990 | Jones | |
| 4,968,273 A | 11/1990 | Momot | |
| 4,981,453 A | 1/1991 | Krishan et al. | |
| 5,050,519 A | 9/1991 | Senften | |
| 5,084,630 A | 1/1992 | Azimi | |
| 5,577,942 A | 11/1996 | Juselis | |
| 5,675,116 A | 10/1997 | Hillenbrand | |
| 5,678,504 A | 10/1997 | Toplosky et al. | |
| 5,690,014 A | 11/1997 | Larkin | |
| 5,902,163 A | 5/1999 | Barruzzi et al. | |
| 6,099,368 A | 8/2000 | Gorshkov | |
| 6,194,815 B1 | 2/2001 | Carroll | |
| 6,260,501 B1 | 7/2001 | Agnew | |
| 6,285,807 B1 | 9/2001 | Walt et al. | |
| 6,408,792 B1 | 6/2002 | Markels, Jr. | |
| 6,561,856 B1 | 5/2003 | Gorshkov | |
| 6,814,633 B1 | 11/2004 | Huang | |
| 6,908,229 B2 | 6/2005 | Landrieve et al. | |
| 6,980,228 B1 | 12/2005 | Harper | |
| 7,350,475 B2 * | 4/2008 | Borgwarth et al. | 114/260 |
| 7,371,136 B2 * | 5/2008 | Hine et al. | 440/9 |
| D578,463 S | 10/2008 | Treaud et al. | |
| 7,641,524 B2 | 1/2010 | Hine et al. | |
| 7,955,148 B2 | 6/2011 | Corradini | |
| 8,043,133 B2 | 10/2011 | Hine et al. | |
| 8,205,570 B1 | 6/2012 | Tureaud et al. | |
| 2003/0009286 A1 | 1/2003 | Shibusawa et al. | |
| 2003/0174206 A1 | 9/2003 | Moroz | |
| 2003/0220027 A1 | 11/2003 | Gorshkov | |
| 2004/0102107 A1 | 5/2004 | Gorshkov | |
| 2004/0217597 A1 | 11/2004 | Carroll et al. | |
| 2006/0213167 A1 | 9/2006 | Koselka | |
| 2007/0051292 A1* | 3/2007 | Kilbourn et al. | 114/311 |
| 2007/0173141 A1 | 7/2007 | Hine et al. | |
| 2008/0188150 A1 | 8/2008 | Hine et al. | |
| 2008/0294309 A1 | 11/2008 | Kaprielian | |
| 2008/0299843 A1 | 12/2008 | Hine et al. | |
| 2009/0107388 A1* | 4/2009 | Crowell et al. | 114/336 |
| 2009/0193715 A1 | 8/2009 | Wilcox | |
| 2009/0311925 A1 | 12/2009 | Hine et al. | |
| 2010/0268390 A1 | 10/2010 | Anderson | |
| 2012/0029696 A1 | 2/2012 | Ota | |
| 2012/0029718 A1 | 2/2012 | Davis | |
| 2012/0069702 A1 | 3/2012 | Muyzert et al. | |
| 2012/0094556 A1 | 4/2012 | Hine et al. | |
| 2012/0295499 A1 | 11/2012 | Hine | |

FOREIGN PATENT DOCUMENTS

| | | |
|---|---|---|
| CN | 268-9229 A | 3/2005 |
| CN | 1715136 A | 1/2006 |
| DE | 10141805 A1 | 5/2002 |
| DE | 10300599 A1 | 7/2004 |
| DE | 102007053037 A1 | 5/2009 |
| EP | 1369013 A1 | 12/2003 |
| FR | 1159028 A | 6/1958 |
| FR | 2669886 A1 | 6/1992 |
| GB | 2461792 A | 1/2010 |
| JP | S 55-051697 | 4/1970 |
| JP | S 55-152698 | 11/1980 |
| JP | S 61-057488 | 3/1986 |
| JP | S 63-149289 | 6/1988 |
| JP | S 64-050199 | 3/1989 |
| TW | 221588 | 3/1994 |
| TW | 547434 | 8/2003 |
| WO | 87/04401 A1 | 7/1987 |
| WO | 94/10029 A1 | 5/1994 |
| WO | 98/39205 A1 | 9/1998 |
| WO | 98/46065 A1 | 10/1998 |
| WO | 01/42992 A1 | 6/2001 |
| WO | 2007/087197 A2 | 8/2007 |
| WO | 2008/109022 A2 | 9/2008 |
| WO | 2013/077931 A2 | 5/2013 |

OTHER PUBLICATIONS

Advanced Technology Office, "Persistent Ocean Surveillance Station-Keeping", DARPA; EXIF metadata shows image created Oct. 5, 2005, 1 page.

Anderson B. and Padovani, B., "Towards a Comprehensive Regional Acoustic Study for Marine Mammal Distribution and Activity Regulation", A Liquid Robotics White Paper, Jan. 2012.

Clement et al., Wave energy in Europe: Current status and perspectives, Renewable and Sustainable Energy Reviews, 2002, p. 431, vol. 6, No. 5.

Communication from Japanese Patent Office on Oct. 18, 2011 on Japanese Application No. 2008-551327. [English translation].

Communication from Chinese Patent Office on Aug. 24, 2011 on Chinese Application No. CN200880006903.

Darpa, "Persistent from Ocean Surveillance, Station Keeping Buoys, Program Overview", Aug. 31, 2004, 19 pages.

Department of the Navy., "ONR/MTS Buoy Workshop 2006, Persistent Unmanned Autonomous Buoy", 21 pages, believed to have been published Mar. 13, 2006.

Extended European Search Report and Opinion for EP Application No. 08726305, mailed on Jan. 15, 2013, 7 pages.

International Search Report for PCT/US2008/002743, mailed Sep. 8, 2008, 3 pages.

International Search Report and Written Opinion for PCT/US2012/029696, mailed Apr. 4, 2013, 21 pages.

International Search Report and Written Opinion for PCT/US2012/029718, mailed Dec. 21, 2012, 20 pages.

International Search Report and Written Opinion for PCT/US2012/029703, mailed Oct. 17, 2012, 14 pages.

International Search Report and Written Opinion for PCT/US2012/044729, mailed Oct. 17, 2012, 11 pages.

Joanne Masters, "Liquid Robotics Ocean Robots Embark on World Record Journey Across Pacific Ocean to Foster New Scientific Discoveries", Liquid Robotics, press release Nov. 17, 2011, 2 pages, San Francisco, CA.

Jones and Young., "Engineering a large sustainable world fishery," Environmental Conservation, 1997, p. 99-104, vol. 24.

Latt, Khine. "Persistent Ocean Surveillance—Station Keeping Buoys, Program Overview", DARPA, Aug. 31, 2004, 19 pages.

Lenton and Vaughan., "The radiative forcing potential of different climate geoengineering options", Atmos. Cem. Phys. Discuss., 2009, p. 2559-2608, vol. 9.

(56) References Cited

OTHER PUBLICATIONS

Martin, J.H and Fitzwater, S.E., "Iron Deficiency Limits Phytoplankton Growth in the north-east Pacific Subarctic", Nature, 1988, vol. 331, p. 341-343.

Martin., "Glacial-Integral CO2 Change: The Iron Hypothesis", Paleoceanography, 1990, p. 1-13, vol. 5, No. 1.

Olson, Robert A., "Communications Architecture of the Liquid Robotics Wave Glider", 2012.

Phelps, Austin. "Wave-Powered Motor Propels Model Boat", Popular Mechanics, Aug. 1949, pp. 182-183.

Rainville, Luc. "Wirewalker: an Autonomous Wave-Powered Vertical Profiler", Aug. 19, 2001, 7 pages.

Shaw, Albert. "The American Monthly Review of Reviews—An International Magazine", vol. 19, Jan.-Jun. 1899, 2 pages.

Solomon, S. et al., "Irreversible climate change due to carbon dioxide emissions", Proc. Natl. Acad. Sci. USA, 2009, vol. 106, No. 6, p. 1704-1709.

Sparks, David. "Persistent UnManned Autonomous Buoy (PUMA)", ONR/MTS Buoy Workshop 2006, SeaLandAire Technologies, Inc., Mar. 15, 2006, Texas A&M University, College Station, 26 pages.

Wilcox; S. et al. "An autonomous mobile platform for underway surface carbon measurements in open-ocean and coastal waters", In Proceedings MTS/IEEE OCEANS 2009, Biloxi, MS, Oct. 2009.

Liquid Robotics (brochure), 2011, 48 pages retrieved from [http://liquidr.com/resources/press-kit.html] on Apr. 30, 2013.

Specifications REMUS 600—Autonomous underwater vehicle, Kongsberg Maritime, 3 pages, retrieved on May 13, 2013 from http://www.km.kongsberg.com/ks/web/nokbg0240.nsf/AllWeb/F0437252E45256BDC12574AD004BDD4A?OpenDocument.

Vehicle Control Technologies, HarborScan Autonomous Scanning UUV, 3 pages, Jul. 2012.

Bluefin Robotics Corporation, Bluefin-12D, Dec. 3, 2010, 2 pages.

Department of the Navy, Office of Naval Research, Large Displacement Unmanned Undersea Vehicle, ONR Program Code 32, Nov. 2010, 1 page.

Department of the Navy, Office of Naval Research, Large Displacement Unmanned Underwater Vehicle Innovative Naval Prototype Technology, ONRBAA Announcement # 11-025, Jul. 27, 2011, 34 pages.

Olson, Robert A., "Communications Architecture of the Liquid Robotics Wave Glider", presented at Navigation Guidance and Control of Underwater Vehicles Conference, University of Porto, Porto, Portugal, Apr. 2012, 5 pages.

International Search Report and Written Opinion of International Application No. PCT/US2012/055797, mailed May 28, 2013, 11 pages.

* cited by examiner

WAVE-POWERED ENDURANCE EXTENSION MODULE FOR UNMANNED UNDERWATER VEHICLES

RELATED APPLICATIONS

This application claims the priority benefit of U.S. Ser. No. 61/535,322 filed Sep. 15, 2011; U.S. Ser. No. 61/535,116 filed Sep. 15, 2011; and U.S. Ser. No. 61/585,229 filed Jan. 10, 2012.

All of the following patent applications are hereby incorporated herein by reference for all purposes: U.S. Ser. No. 60/760,893, filed Jan. 20, 2006; U.S. Ser. No. 60/904,647, filed Mar. 2, 2007; U.S. Ser. No. 11/436,447, filed May 18, 2006, now U.S. Pat. No. 7,371,136; U.S. Ser. No. 12/082,513, filed Apr. 11, 2008, now U.S. Pat. No. 7,641,524; U.S. Ser. No. 60/841,834 filed Sep. 1, 2006; PCT/US2007/01139, filed Jan. 18, 2007, published Aug. 2, 2007 as WO 2007/001139; PCT/US2008/002703, filed Feb. 29, 2008, published Sep. 12, 2008 as WO 2008/109002; U.S. Ser. No. 61/502,279, filed Jun. 28, 2011; and U.S. Ser. No. 61/574,508, filed Aug. 2, 2011.

All of the following patent applications are hereby incorporated herein by reference for all purposes: U.S. Ser. No. 61/535,322 filed 15 Sep. 2011; U.S. Ser. No. 61/535,116 filed 15 Sep. 2011; U.S. Ser. No. 61/585,229 filed 10 Jan. 2012; PCT/US2012/029718 filed 19 Mar. 2012; PCT/US2012/029696 filed 19 Mar. 2012; PCT/US2012/029703 filed 19 Mar. 2012; U.S. Ser. No. 13/424,239 filed 19 Mar. 2012; U.S. Ser. No. 13/424,170 filed 19 Mar. 2012; U.S. Ser. No. 13/424,156 filed 19 Mar. 2012; PCT/US2012/044729, filed 28 Jun. 2012; and U.S. Ser. No. 13/536,935, filed 28 Jun. 2012.

FIELD OF THE INVENTION

The information disclosed and claimed below relates generally to the fields of vessel motility and autonomous operation. More specifically, it provides a module separate from an underwater vehicle that derives locomotive thrust from wave action and is capable of pulling the underwater vehicle between locations or through a current.

BACKGROUND OF THE INVENTION

Unmanned Underwater Vehicle (UUV) technology is currently under development for use in industry and the military. Autonomous devices are equipped to navigate under water without an operator on board, and without direct continuous input from a remote operator. Examples are illustrated in U.S. Pat. Nos. 5,690,014 and 5,675,116 (U.S. Navy), and in U.S. Pat. Nos. 8,205,570 and D578,463 (Vehicle Control Technologies Inc.). Devices currently in production for civilian industrial use are the REMUS 600™, manufactured by Kongsberg Maritime in Kongsberg, Norway; the HarborScan™ UUV, manufactured by Vehicle Control Technologies Inc., Reston Va., U.S.A.; and the BlueFin™ model 12D, manufactured by Bluefin Robotics Corp., Quincy Mass., U.S.A.

Another platform currently under development is the LDUUV (Large Displacement UUV) by the Office of Naval Research, Arlington Va., U.S.A. In a current embodiment, the LDUUV is approximately 20 feet long and weighs several tons, which limits its range and the durability of missions before maintenance or refueling. The Office of Naval Research has published the Navy research initiative ONR BAA 11-025 describing future objectives of the UUV program.

A previously unrelated field of nautical technology is vessels that derive locomotive thrust from wave motion. As a wave travels along the surface of water, it produces vertical motion. The amplitude of the vertical motion decreases with depth; at a depth of about half the wave length, there is little vertical motion. The speed of currents induced by wind also decreases sharply with depth.

Various devices have been designed and proposed to harness wave power to do useful work. For example, U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856; U.S. published applications US 2003/0220027 A1 and US 2004/0102107 A1; and international published applications WO 1987/04401 and WO 1994/10029.

Wave-powered vessels have been described in U.S. Pat. No. 7,371,136; U.S. Pat. No. 8,043,133; and published applications US 2008/188150 A1; US 2008/299843 A1; and WO 2008/109022. Exemplary vessels are manufactured and sold by Liquid Robotics, Inc., Sunnyvale Calif., USA under the brand Wave Glider®.

SUMMARY OF THE INVENTION

This disclosure provides a new approach and new technology for providing auxiliary thrust and/or power generation to an unmanned underwater vehicle.

An extension module (EXM) of this invention can be used with an underwater vehicle to provide a vessel combination with increased power durability and range of operation. One or more UUV tethers or other linkages interconnect the UUV with the EXM, thereby allowing the EXM to pull the UUV through a body of water, decreasing energy expenditure by the UUV. The tethers and couplings can also be configured so that the UUV can pull the EXM, for example, when the vessel combination is becalmed.

The EXM is any device or module that harvests horizontal thrust or propulsion directly or indirectly from wave motion. One such EXM comprises a float, a swimmer; and one or more EXM tethers connecting the float to the swimmer. The float is buoyed to travel on or near the surface of a body of water, and the swimmer is weighted to travel in the water below the float, hanging by the EXM tethers. The swimmer comprises fin surfaces that mechanically provide forward thrust when actuated by rising and falling of the swimmer in the water.

The EXM-UUV vessel combinations of this invention may also comprise a cradle configured for securing on or within the UUV and configured to receive the EXM. The EXM may be reversibly drawn to and secured upon or within the UUV in a retracted configuration by retracting the tethers, for example, by operating tether winches aboard the EXM or the UUV. Buoyancy of the float may be decreased when the EXM is refracted to the UUV, and increased when the EXM is deployed from the UUV. The EXM may be released from the cradle into a deployed or extended configuration by reversing the winches, thereby unpacking the EXM and positioning it to harvest wave motion and tow the UUV.

A UUV tether extended behind the EXM may be provided with a docking means by which the UUV may be joined to the EXM in a docked configuration, and released from the EXM in an undocked or independent configuration. The docking means typically has concave surfaces configured to accommodate and latch onto the front of the UUV, and is configured with vents to allow passage of water to decrease frontal drag when pulled by the EXM.

The EXM may be provided with a means for converting solar energy to electrical power and/or a means for converting wave motion to electrical power. The EXM may store the electricity and/or supply electrical power to the UUV.

Aspects of this invention include but are not limited to the EXM-UUV combination in a refracted or deployed configuration, a wave-powered vessel adapted for use as an EXM for tethering to a UUV, a cradle configured for securing on or within a UUV and configured to receive a wave-powered EXM when retracted thereto, and a tether configured for attachment to an EXM comprising a reversible docking means for a UUV.

This invention also provides a method of providing locomotive thrust to an unmanned underwater vehicle (UUV) by operating an extension module (EXM) that has been tethered to the UUV. The EXM is operated to derive locomotive thrust from wave motion, thereby pulling the UUV. In some instances, locomotive thrust of the EXM moves the UUV to a new location, or counters current flow so as to keep the UUV in substantially the same geographic location (referred to as hovering or loitering). Optionally, the motor or locomotion means within the UUV may be turned off while the UUV is being pulled by the EXM.

Where the UUV tether comprises a docking means for reversibly receiving the UUV, the UUV may detach from the UUV tether(s), locomote away from the EXM, and then reunite and reattach to the EXM by docking back to the docking means on the UUV tether(s). While attached or separate from the EXM, the UUV may perform a variety of commercially or militarily important missions, such as dispensing cargo or conducting measurements of the underwater environment.

Further aspects of the invention will be evident from the description that follows.

BRIEF DESCRIPTION OF THE DRAWINGS

FIG. 1A shows the EXM held in a cradle before installation onto the top surface of the UUV. FIG. 1B shows the EXM and its cradle installed on and retracted onto the UUV. FIG. 1C shows the EXM deployed from the UUV. The EXM comprises a float and a swimmer, derives locomotive power from wave motion, and tows the UUV by way of two tethers.

DETAILED DESCRIPTION

This invention provides an Endurance Extension Module (EXM) for powering an Unmanned Underwater Vehicle (UUV). The EXM converts wave motion to locomotive thrust, pulling the UUV from point to point or keeping it in place against an opposing current. The EXM may also supply the UUV with electricity for driving an electric motor or powering on-board electronics. The EXM can be retracted onto the UUV when not in use to minimize drag, or it can release the UUV for a subsequent rendezvous. The EXM-UUV combinations of this invention allow extended autonomous missions over wider territory for purposes such as surveying or monitoring conditions or delivering cargo.

Figure 1A:
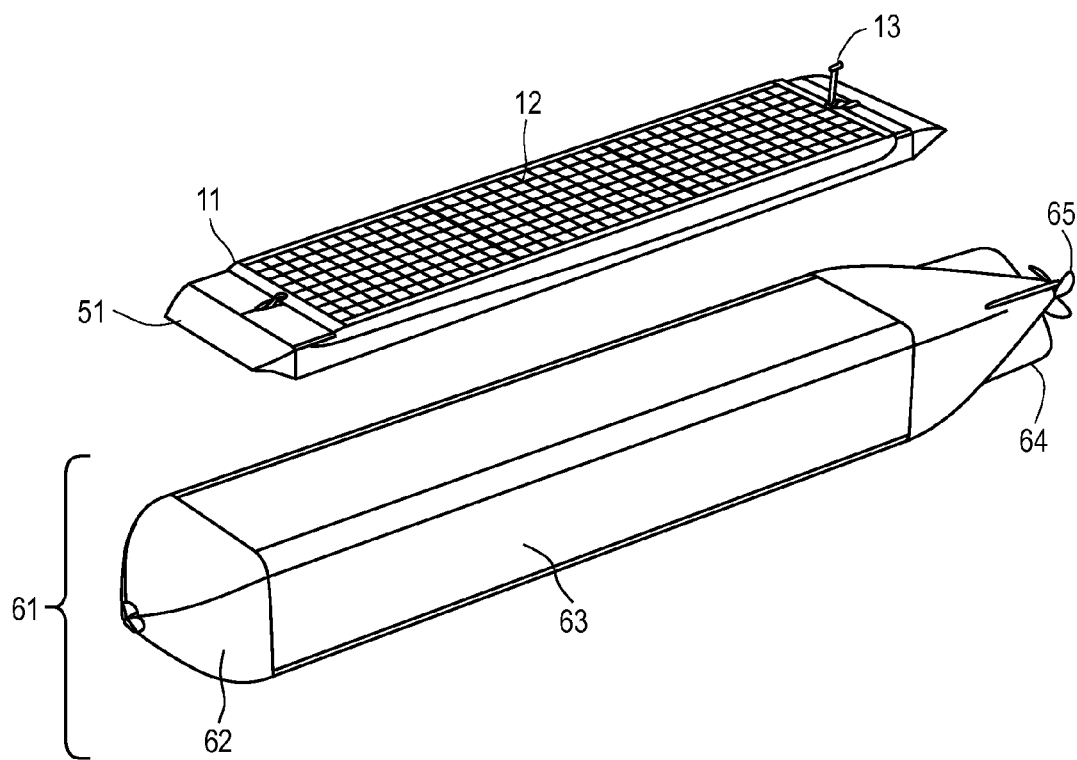
FIGS. 1A, 1B, and 1C are front side perspectives of an Endurance Extension Module (above) combined with an unmanned underwater vehicle (below).
Figure 1B:
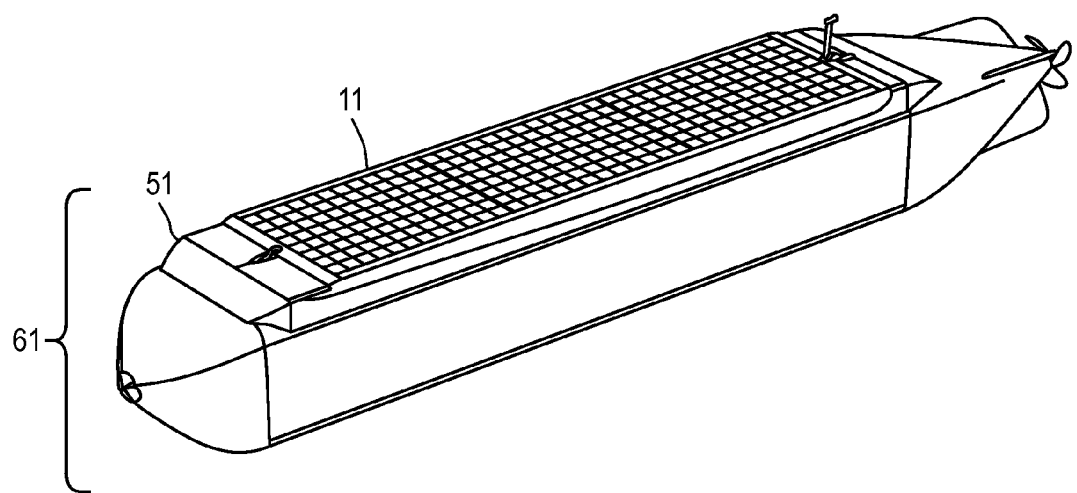
Figure 1C:
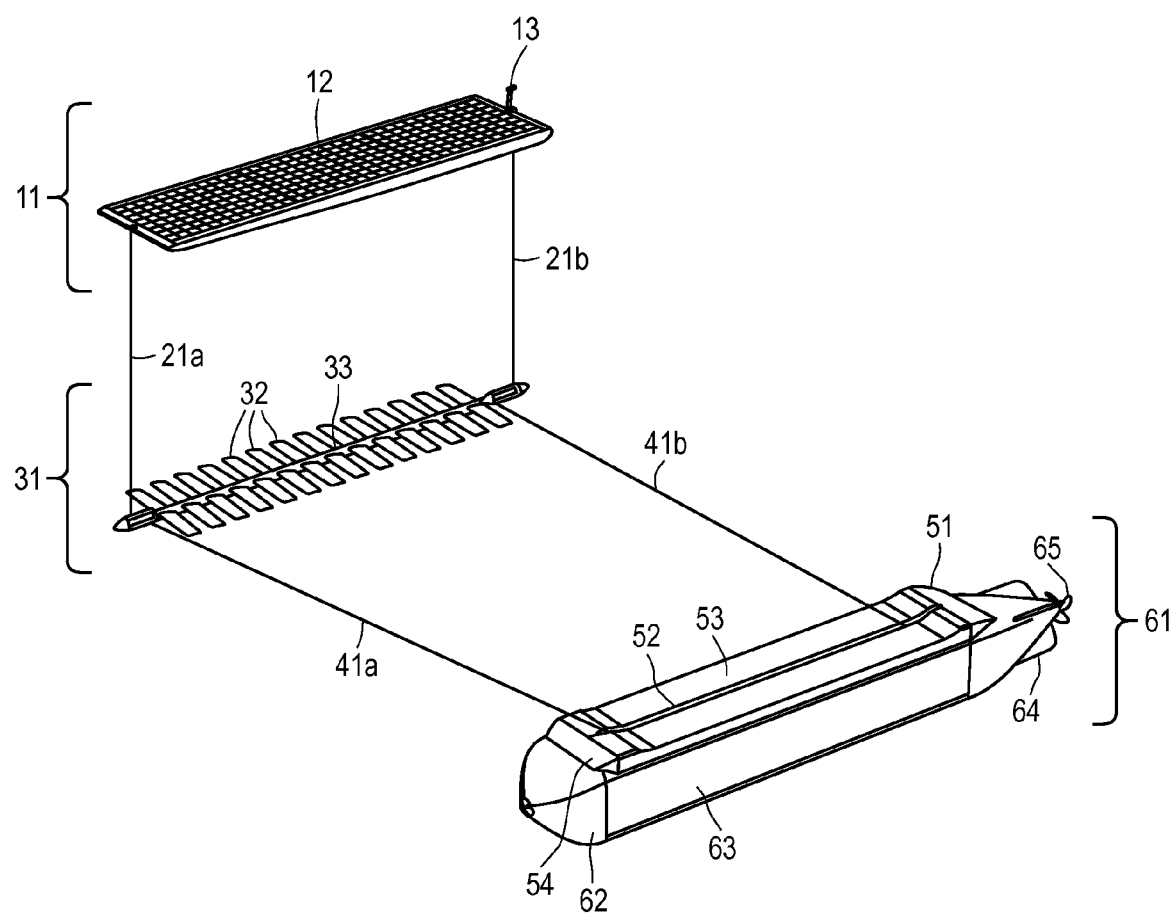

FIGS. 1A, 1B, and 1C depict an example in which the EXM works like a back pack that can be installed on a standard production UUV 61, thereby improving its loiter capabilities. It is a modular system where the EXM is carried on a cradle 51 that can be installed when needed, and removed or jettisoned when it is not needed. The EXM comprises a float 11, a swimmer 31, one or more lines or tethers 41a and 41b that connect the EXM to the UUV, and a retraction mechanism (not shown). Besides providing locomotive power, the EXM can provide a platform for generating electrical power, projecting one or more antennae for communication, and projecting one or more surface-based sensors, detectors, or cameras.

In this example, the float 11 supports solar panels 12 and an antenna 13. It contains flotation foam, or alternatively may contain adjustable buoyancy tanks such as air bladders that inflate. The swimmer 31 has fins 32 for converting wave motion to lateral thrust. When retracted, the EXM sits on top of the UUV 61 in a compact package with minimal frontal area 54 so that it has minor impact on drag. In the packed configuration, the UUV can operate at high speed and depth below reach of the connecting lines 41a and 41b, carrying the EXM like a back-pack for later deployment to resume hovering mode.

Figure 2:
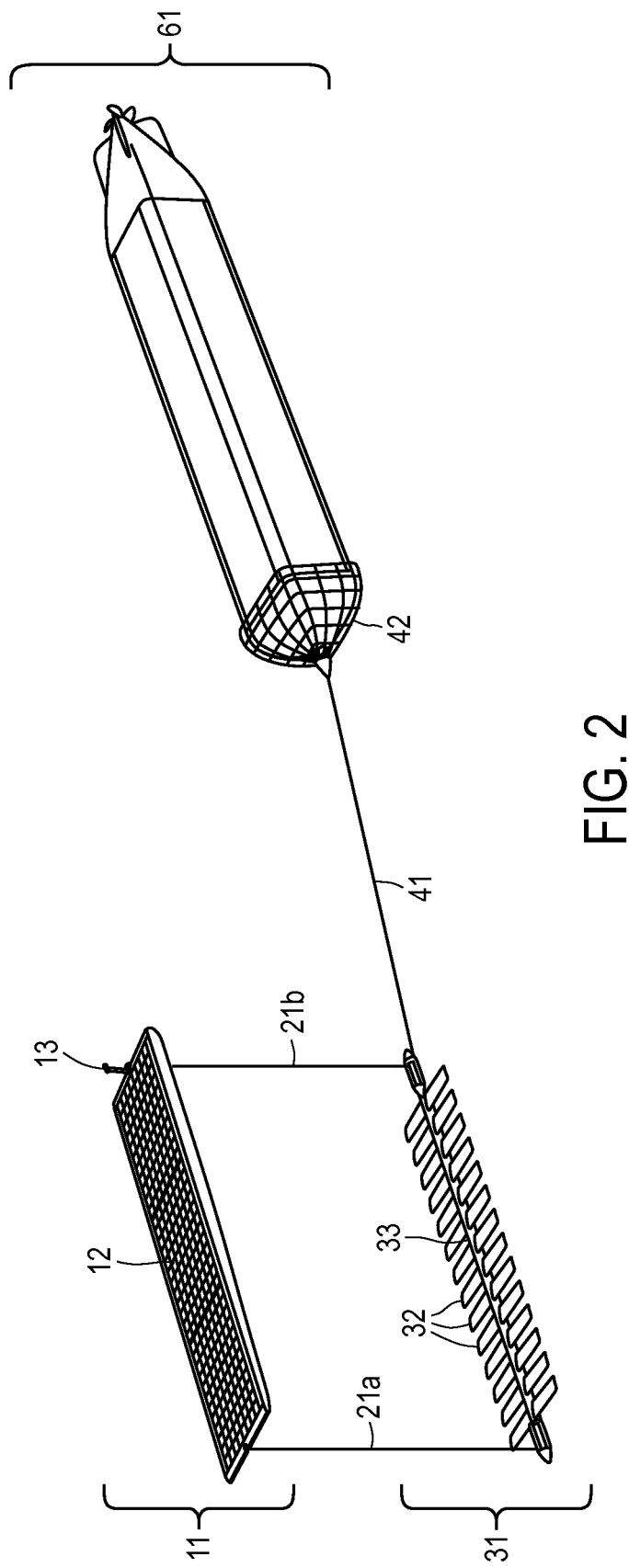
FIG. 2 is a front side perspective of an EXM pulling a UUV by way of a single tether. The trailing end of the tether comprises a docking cone that conforms to and latches onto the front of the UUV.

FIG. 2 depicts another example in which the EXM has a tether 41 with a docking nozzle or receptacle 42 configured for mating with the front of the UUV. This allows the UUV to detach from the EXM and sprint away to fulfill a mission, and then redock with the EXM in quiescent mode. The EXM comes into play during mission loiter periods, or during periods of slow transit, or after mission completion and prior to recovery. When deployed, the EXM provides propulsion and power regeneration capability as well as surface communications. These examples are discussed more extensively in a later section of this disclosure Advantages Depending on how it is configured, an EXM of this invention may provide the user with one or more of the following benefits:

The EXM does not require and typically does not have any on-board solid, liquid, or nuclear fuel for locomotion. In a typical embodiment, wave power is converted mechanically to horizontal thrust, propelling the EXM through the water, which in turn tows the underwater vessel. Wave motion as a source of power is naturally occurring and inexhaustible.

The EXM increases the endurance of an underwater vessel in the sense that it may be deployed for longer periods without refueling or servicing. This can increase the overall time and distance of a mission and the geographical range that may be surveyed or in which cargo may be deployed.

The EXM enables an underwater vessel to adopt a hovering mode in the face of opposing current. Rather than using the resources of the motor and fuel cells aboard the underwater vessel, the EXM provides horizontal thrust to propel the vessel combination against the current to the extent needed to maintain the vessel in substantially the same geographical position. When the motor aboard the underwater vessel is not needed for propulsion, it may be turned off or secured to decrease wear and tear or attrition.

The EXM can provide a source of renewable electrical power to the underwater vessel. As described below, electricity can be generated by solar panels atop the float and/or by harnessing wave motion, and then transmitted back to the vessel by an electrical connection associated with the tether, or by induction.

The EXM can also provide a retractable surface platform for other activities, such as radio communication, surface or off-shore surveillance or monitoring, or surface cargo deployment.

Wave Motion as an Energy Source for Vessel Propulsion

The EXM of this invention is a module separate from the UUV, and pulls the UUV in or through the water. The EXM derives some or all of its locomotive thrust from wave power. In principle, the wave power may be converted to electricity or other energy storage means, which can then be used to power a propeller or turbine. Usually for sustained use it is more efficient to convert wave motion directly by mechanical means to provide most or all of the horizontal propulsion.

Figure 3:
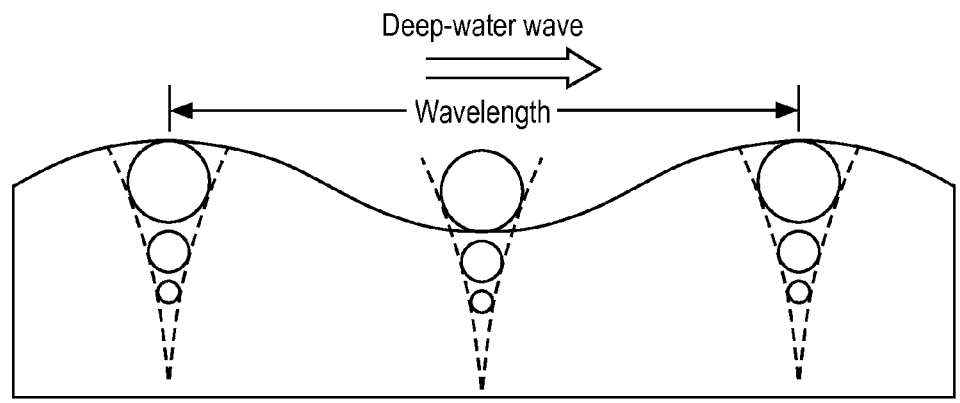
FIG. 3 shows how water near the surface moves in roughly circular orbits that can be harvested to propel a vessel across the body of water.

FIG. 3 depicts in principle how wave motion can be approximated for many purposes as a linear superposition of roughly sinusoidal waves. The waves have varying wavelength, period and direction. As a wave moves horizontally along the surface, the water itself moves in roughly circular orbits of logarithmically decreasing diameter with depth. The vertical component, the horizontal component, or both may be harvested and converted into horizontal thrust for the purpose of propelling the vessel through the water.

Wave-powered vessels may be configured to exploit the motion between the tops and bottoms of waves at the sea surface in the following way. A vessel body is positioned at or near the surface, a submerged swimmer or glider component is positioned underneath, and connected to the vessel body by one or more tethers. As waves lift and lower the float portion, wings or fins on the submerged swimmer passively rotate so as to convert the relative motion of the surrounding water into forward thrust. The azimuth of the thrust vector can be directed completely independently of the direction of the waves by a rudder at the back of the swimmer. The wings have a short chord dimension to minimize lost motion between the up stroke and the down stroke, converting even very small waves into forward thrust.

Figure 4:
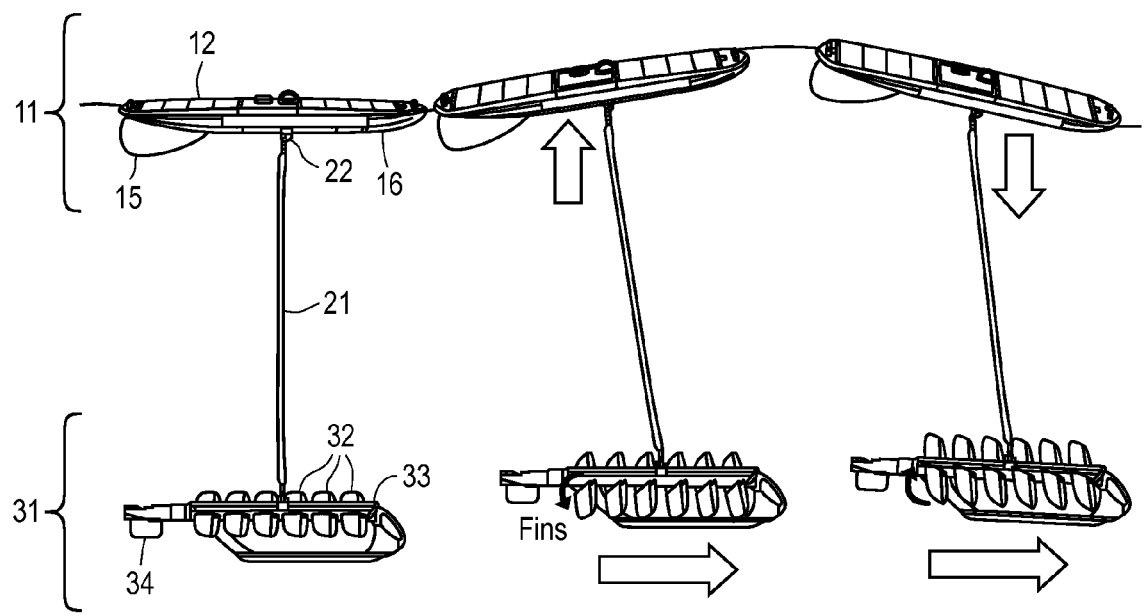
FIG. 4 is a side view of a wave-powered vessel showing the principle of converting wave motion to locomotive thrust.

FIG. 4 is an upper side view of a wave-powered vehicle that illustrates this design. The vehicle comprises a float or vessel body 11 resting on the water surface, and a swimmer 31 hanging below, suspended by one or more tethers 21. The float 11 comprises a displacement hull 16 and a fixed keel fin 15. The swimmer comprises a rudder 34 for steering and wings or fins 32 connected to a central beam 33 of the rack so as to permit rotation of the wings around a transverse axis within a constrained range, and provide propulsion. The tethers 21 may be attached at either end by way of a winch 22 for retracting the swimmer 31 up to the float 11 for purposes of storage or navigational adjustment and then deploying the swimmer 31 downwards for full operation.

In still water (shown in the leftmost panel), the submerged swimmer 31 hangs level by way of the tether 21 directly below the float 11. As a wave lifts the float 11 (middle panel), an upwards force is generated on the tether 21, pulling the swimmer 31 upwards through the water. This causers the wings 32 of the swimmer to rotate about a transverse axis where the wings are connected to the rack 33, and assume a downwards sloping position. As the water is forced downward through the swimmer, the downwards sloping wings generate forward thrust, and the swimmer pulls the float forward.

After the wave crests (rightmost panel), the float 11 descends into a trough. The swimmer 21 also sinks, since it is heavier than water, keeping tension on the tether 21. The wings 32 rotate about the transverse axis the other way, assuming an upwards sloping position. As the water is forced upwards through the swimmer, the upwards sloping wings generate forward thrust, and the swimmer again pulls the float forwards. Thus, the swimmer generates thrust when both ascending and descending, resulting in forward motion of the entire craft.

As an alternative to the float and swimmer combination, other wave powered vessel designs can be adapted for use as an EXM. By way of illustration, the vessel may comprise dual fins set in a side-by-side configuration beneath the bow. The fins convert wave energy into a dolphin-like kick that can propel a load of up to three tons at five knots. See Popular Mechanics magazine, October 2009. Alternatively, wave powered vessels may incorporate an adjustable sail and keel for aerodynamic and hydrodynamic shear force resolution for directional thrust. US 2009/0193715 A1. See also U.S. Pat. No. 4,842,560, wave powered propulsion system for watercraft; U.S. Pat. No. 7,955,148, hydroelectric turbine-based power-generating system for vessels; and U.S. Pat. No. 6,814,633, wave powered vessel.

Using an EXM to Provide Locomotive Power to a UUV

In its minimum configuration, an EXM-UUV combination of this invention will typically comprise two components: (1) an underwater component that is capable of travelling and operating without a human on board and without being attached to the EXM; and (2) the extension module that provides locomotive power to pull or drive the UUV across or through the water when desired instead of or as well as the UUV's on-board propulsion mechanism. The EXM derives part or all of its locomotive thrust from wave motion, either mechanically, or by conversion to and from an energy storage means such as electrical, gravitational, or chemical potential, or a combination of both direct mechanical conversion and through a storage means.

Referring to FIG. 1A, an underwater vessel 61 is depicted as having a hydrodynamically shaped nose or front 62, a substantially cuboid body 63, rear fins 64 for promoting even travel, and a propeller 65 or turbine for providing locomotive thrust when the vessel is operating by itself. The EXM-UUV configuration may be created by joining and securing an EXM carried by a cradle 51 on or within an underwater vessel 61 in a permanent or detachable manner.

Here, the cradle 51 is configured underneath to mate with the upper surface of the vessel 61. Lying on top of the cradle 51 is the EXM comprising the float 11 and the swimmer (hidden beneath the float in this view). The float is depicted as having solar panels 12 on its upward-facing surface for producing electricity and an antenna 13 for wireless communication when the float is above the water. The cradle 51 is adapted on its upper surface to accommodate the swimmer and the float in compact retracted configuration. As an alternative, the vessel can be engineered from the outset to conform substantially to and thereby receive the EXM directly when the two are retracted together. The advantage of the cradle 51 is that it allows the EXM to be installed on a standard production UUV. The means of securing the cradle to the UUV can be selected so that the cradle may be affixed permanently, or so that it can be released or jettisoned under water, for example, to free up the UUV for a particular operation, or to create a decoy.

In FIG. 1B, the cradle 51 carrying the EXM is shown retracted onto the surface of the underwater vessel 61 to provide a configuration that is the most compact and protective. This conformation may be adopted for storage of the combination on land or for hydrodynamic travel under water.

FIG. 1C shows the combination when deployed in a body of water with the EXM positioned to tow the underwater vessel 61.

The EXM comprises the float 11 and the swimmer 31 which work together to convert wave motion to horizontal thrust. The swimmer 31 shown here is depicted as having a rack with a single central spine or beam 33 upon which the fins or wings 32 are mounted. In other configurations, the rack may have outer rails, with one, two, or more than two rows of fins. A single rack facilitates retraction onto the cradle, but there may be multiple racks configured for nesting. As before, the fins rotate over a limited range about an axis that is horizontally perpendicular to the rail so as to provide forward thrust as the swimmer 31 travels up and down as a result of wave action on the float 11. In this example, the float 11 is joined to the swimmer 31 by way of two EXM flexible or rigid tethers that are mounted fore 21a and aft 21b. A plurality of tethers may be used in an EXM in preference to a single tether, so that the float 11 and swimmer 31 may track more closely together.

Winch systems to retract tethers 21a and 21b can be mounted on the float 11 or the swimmer 31. Winch systems to retract tethers 41a and 41b can be mounted on the swimmer 31, the cradle 51, or directly on the UUV 61. Alternatively, in either case, by placing a winch at the middle of each tether for winding both ends, slip rings can be eliminated for the power and communications lines that deploy alongside one or more of the tethers.

The cradle 51 is depicted here as having a substantially flat surface 52 configured to mate with the EXM. A groove 53 down the center may be provided to promote the range of motion or retractability of the EXM. The cradle has a leading edge 54 that is designed to make both the cradle and the EXM frontally hydrodynamic when the EXM is retracted, thereby minimizing or substantially lowering hydrodynamic drag when the vessel 61 is being propelled by the onboard propeller 65. Depending on the dimensions and speed of the vessel, drag may be reduced so that the additional power needed to propel the vessel with the EXM on board is no more than about 20%, 10%, or even 5% of the power needed without the EXM or cradle attached.

The EXM is attached to the vessel by way of a fore 41a and aft 41b UUV tether between the swimmer 31 and either the float 51 or the vessel itself 61. The tethers are compliant so as to decouple heave motions of the EXM from the UUV, decreasing form drag effects. Two or a plurality of UUV tethers keep the components in yaw, again promoting unified tracking and steerability. The vessel 61 will typically have its own rudder so as to be steerable when not operating with the EXM. The EXM may also have a rudder attached either to the float 11, the swimmer 31 or both so as to provide steering when the EXM is towing the underwater vessel. Where multiple rudders are present, they may be controlled and coordinated by an on-board microprocessor.

Deploying the EXM from the UUV

When the EXM is packed into a cradle atop the UUV as in FIGS. 1A and 1B, it may be deployed as follows. The UUV will typically surface first, and confirm appropriate surface conditions exist for deployment. It will then activate the EXM by unlatching the restraints and allowing the connecting lines to pay out from the retraction winches. The float will remain at the surface where will be coupled to the ocean surface and will move up and down with the waves. The swimmer hangs below the float by 1-20 meters (typically 4-8 meters) and will be pulled up and down through relatively still water. Wings on the swimmer pitch up and down, to generate thrust during both the up and down motions of the float. the tethers between the UUV mounting structure and the swimmer allows the swimmer to move up and down while the UUV remains at a relatively constant depth.

Once deployed, the UUV may steer the entire system using its existing rudder. In addition or instead (for example, if the UUV uses directional thrusters for steering) then a rudder may be installed on the float and/or the swimmer.

Depending on conditions and their operational capabilities, the EXM and UUV may be operated in other configurations. For example, when seas are becalmed or when the wave harvesting mechanism of the EXM is inoperative, the EXM may be retracted back onto the cradle or onto the UUV. Alternatively, in such circumstances, it may be desirable to leave the EXM on the surface, for example, to harvest solar power, maintain communications, or continue operation of surface-mounted sensors. In this case, the UUV may contribute to or be solely responsible for any locomotion of the EXM-UUV combination (for example, for traveling to a new location or for hovering against an oncoming current). The components thus reverse their more usual roles, with the UUV traveling in front and pulling the EXM by way of the interconnecting tethers.

Dockable Combinations

For some missions, the UUV may be equipped to be reversibly detachable from the EXM while in operation. With this in place, the UUV may detach from the EXM in order to sprint to a new location for a particular activity. It may then navigate back to and dock with the EXM at the old location, the new location, or elsewhere as conditions permit.

FIG. 2 depicts an embodiment that facilitates operation in this fashion. The EXM is joined to the UUV by way of a single UUV tether or tow line 41 from the back of the swimmer 31 to a docking means 42 in which the vessel 61 may dock and be secured for towing. In this example, the docking means 42 is substantially cone shaped, configured with substantially concave shapes on the inner surface of the cone to mate with the substantially convex outer surface of the front or nose of the vessel 61. In this example, the docking means is also rendered more hydrodynamic by providing a plurality of vents for allowing the passage of water through the cone when not towing the vessel. Not shown are mechanical or magnetic couplers that secure the vessel 61 to the docking means 42 with a robustness sufficient to sustain the linkage during towing.

In operation, the vessel 61 detaches from the docking means 42 mounted at or near the aft end of the UUV tether 41, operates a self-contained locomotion means such as a propeller 65 so as to travel away from the components of the EXM 11 and 31, optionally dispenses cargo or conducts measurements of the underwater environment in which the UUV is traveling, and then reunites and reattaches to the EXM by docking back to the docking means 42.

Electricity Generation

In addition to or instead of its role of towing the UUV, an EXM of this invention may serve the function of generating and optionally storing electrical energy.

As shown in FIG. 1, a portion of the EXM that floats upon the water surface upon deployment from the UUV may be equipped with commercial grade photovoltaic cells, such as those manufactured by SunPower Corp., San Jose Calif., U.S.A. Two solar panels each with an area of approximately 4.5 ft$^2$ can provide 10-13 Watts on average at mid-latitudes, corresponding to roughly 250 to 300 Watt hours harvested every day.

As an alternative or in addition to solar panels, the EXM may be equipped with a means whereby wave power may be harvested and converted to electricity. This is further described in PCT/US2012/044729, which is hereby incorporated herein by reference. When wave motion is sufficiently high, enough power can be harvested not only to propel the vessel through the water, but also to provide ample electrical power.

Wave power can be converted to electricity directly by configuring the vessel so that the vertical undulations of the vessel are mechanically coupled to an electrical generator. As shown in PCT/US2012/044729, spring-loaded swing arms can be mounted on the float and connected to the tethers suspending the swimmer. Some of the wave motion is harvested as potential energy in the spring, which can then be converted to electrical power. Motion of the swing arms ultimately results in a mechanical force turning conductive wire or bar within a magnetic field, or turning a magnet through a conductor, thereby generating electricity.

Another way of converting wave motion to electrical power is to harvest the horizontal movement of the water resulting from wave-powered locomotion. For example, a propeller or turbine may be oriented forwards or rearwards to harvest vertical movement through the water, and mechanically coupled to a rotating magnet conductor arrangement that plays the role of generator. The user has the option of configuring the generator to play a reverse role, being caused by electrical power to rotate in the opposite direction, thereby rotating the propeller or turbine so as to generate thrust. In this arrangement, the propeller generator system may be installed on the swimmer of the EXM, on the UUV, or both.

Harvested electrical power may be used to power electronics, charge a battery, or drive a motor for propulsion aboard the EXM. By electrically coupling the EXM to the UUV (for example, by a wire traveling through or near one of the tethers or wirelessly by electromagnetic induction or electrodynamic induction), the EXM can supply electricity to the UUV to power electronics, charge a battery, or drive a motor for propulsion aboard the UUV.

Buoyancy and Navigation

Buoyancy of the UUV and the EXM may be chosen or adapted during operation, depending on the mission requirements.

In one approach, the EXM (as a whole) is positively buoyant while the UUV is made negatively buoyant. This approach is best suited for an integrated EXM, where the UUV will not be required to operate with the EXM jettisoned. The negative buoyancy of the UUV can then be used to provide a downward pull on the swimmer such that it generates thrust during the down phase of motion. When retracted, the float may replace buoyancy components (often syntactic foam) that would normally be installed in the upper portion of the UUV to provide stability. This approach minimizes overall system displacement and thus drag.

In another approach, the EXM is neutrally buoyant. In this case it can be installed as a completely independent module. It may be installed on a UUV with minor modification, and may be jettisoned without requiring the UUV to make major adjustments to its buoyancy. The drawings show an EXM that is neutrally buoyant attached to an approximately neutrally buoyant UUV. If jettisoned, the EXM could swim autonomously to a collection location or act as a decoy while the UUV carries out a sub-surface mission.

If appropriate, buoyancy of the EXM and/or the UUV may be made adjustable to adapt to operating conditions and objectives (for example, by expanding or compressing an inner cavity or releasing compressed gas). For example, the buoyancy of the float may be made adjustable so that buoyancy may be decreased when the EXM is retracted to the UUV, and increased when the EXM is deployed from the UUV. This can facilitate deployment of the EXM from its cradle and operation of the vessel combination following deployment.

For self-directed navigation, the EXM-UUV combination may be equipped with a means of determining the geographical location of the vessel, a means for determining direction, a means for steering the vessel, and a means for operating the steering so that the vessel travels or stays at a target location. Electronics to sense the geographical location of a vessel can triangulate off a series of reference points. For example, the float may be equipped with a GPS receiver, and either the EXM or the UUV can be equipped with an electronic compass or gyroscope to determine the vessel heading. Positional data about the geographical location and the vessel heading is processed in a decision algorithm or programmed microprocessor aboard the EXM or the UUV, which may then provide navigation instructions. Consequently, the rudder or steering means adjusts to head the vessel in accordance with the instructions.

When the EXM has at least one component that rides at or near the water's surface, it provides a platform for equipment of special use to the UUV. These include: (1) GPS positional receivers and other navigational equipment; (2) such detectors and sensors that operate beneficially at or near the surface (for example, to determine items, parameters, or activity in the atmosphere, by a surface-going vessel, or at an on-shore location); (3) wireless transmitters and receivers for radio communication (for example, to receive navigational instructions, mission parameters, or other commands, and to transmit data collected from detectors or sensors aboard the EXM and/or the UUV); and (4) batteries and storage capacity to supplement the capabilities of the UUV.

Proof of Concept

Predictive modeling indicated that in the deployed configuration, the EXM's wave propulsion system can reduce the total energy required to conduct a threshold mission profile by a UUV by 55%. The EXM's solar panel array can harvest an additional 24% of the total energy requirement, resulting in a reduction of the objective mission profile's energy requirement by 79%. When the EXM is stored in a cradle aboard the UUV, it should have minimal impact on UUV sprint speed. Assuming that the EXM system is 9 inches tall and 4 feet wide when on top of the UUV, the additional frontal area is predicted to cost a modest 5.5% reduction in top speed. If the height of the stowed EXM is 12 inches, then the top speed would be reduced by 7.7% to roughly 11.25 knots. The decreased vessel speed would be more than offset by the increased range and mission duration that the EXM provides.

Figure 5:
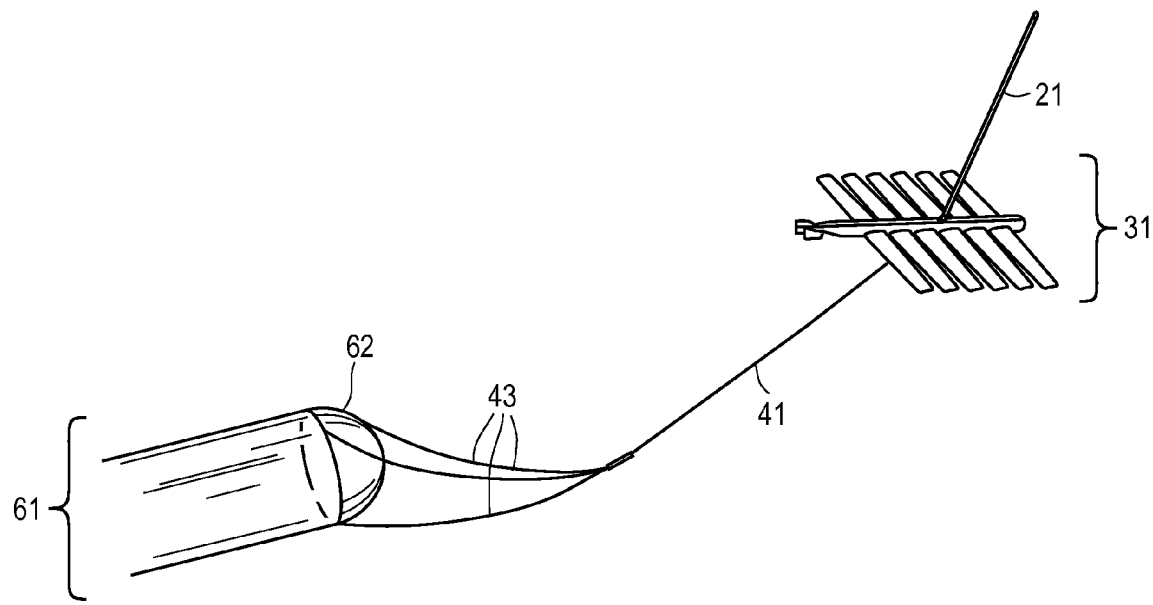
FIG. 5 is an elevated side view showing a detail of a working model in which a UUV (left) is tethered to the swimmer of an EXM (right).
Figure 6:
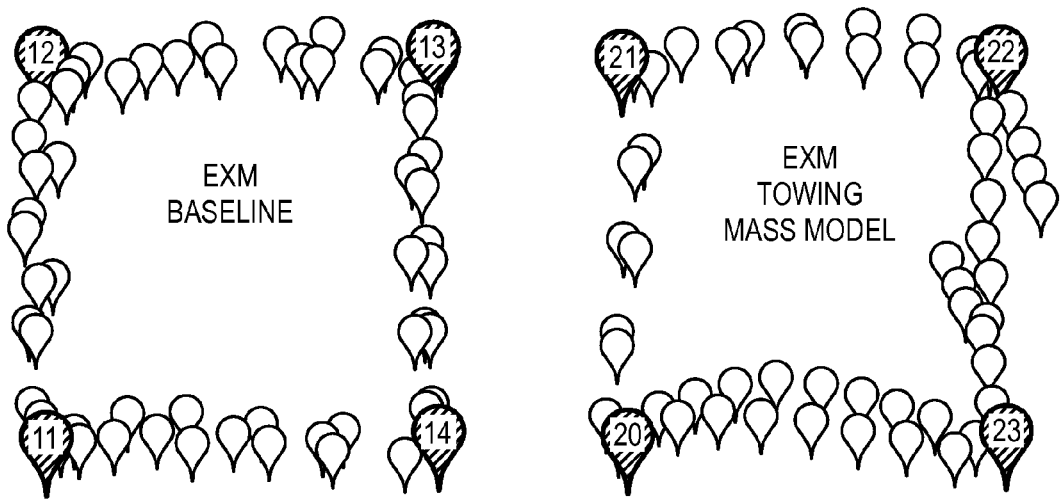
FIG. 6 shows data from a demonstration in which the movement of a prototype EXM around a square course in the ocean (left) is compared with the movement of a prototype EXM towing a prototype UUV (right).

FIG. 5 shows a replica of the autonomous underwater vessel REMUS™ 600. FIG. 6 shows results of a towing test using a mass model in place of a UUV. The mass model was a 10 feet long section of 24" diameter PVC tube 61. A hemispherical nose 62 was mounted to the front of the tube and the tail was left open. The tube was free flooded, with buoyancy provided by a smaller sealed tube mounted inside. The mass model was trimmed to be approximately 1 lb. negatively buoyant. The open tail created vortex as it moved through the water, resulting in higher drag than a closed UUV with contoured fairing.

An eight-foot long three-point bridle 43 with an eight-foot leader 41 was attached to the keel of the swimmer slightly aft of center. No attempt was made to optimize the tow-point configuration on the mass model. The buoyancy of the mass model was adjusted to achieve stable and level travel behind and slightly below the swimmer. The mass model and the water it entrained had a combined mass of 3640 kg. The leader 41 was used for attaching a prototype wave-powered EXM, comprising a swimmer 31 attached by way of an EXM tether 21 to a float (not shown).

FIG. 6 compares the speed of a prototype EXM towing a mass model (right side) with a structurally and functionally equivalent prototype EXM travelling alone. They simultaneously raced adjacent 0.5 km square courses, thereby experiencing substantially the same sea conditions: 1 to 3 feet waves and 10 knot winds. Both the uncoupled EXM and the EXM pulling the mass model were able to navigate the course in good order. The speed of the EXM towing the mass model was 44% slower. This validates the utility of a wave-powered EXM for towing a UUV. Since the square course was short and the EXM slows during each turn, the reduction in speed was more than would typically occur in a typical patrolling scenario without frequent turns.

Drag and tow-bar pulling (drogue drag) forces increase with the cube of the scale factor. These forces balance out so that vessel speed is relatively insensitive to scale. Scaling up by a factor of three, the EXM should tow a 72" diameter tube with similar performance. With an EXM having an average speed of 1.5 knots, the 72" diameter tube would tow at a speed of 0.84 knots. Performance may be improved by providing fairing on the UUV so that it is more hydrodynamic when being pulled by the EXM, while carrying the EXM, or both.

Wave-powered vessels and modules are highly responsive and robust to extreme weather conditions. This was demonstrated when a Liquid Robotics brand Wave Glider® designated "G2" was encroached by hurricane Isaac in the summer of 2012. Isaac had sustained winds of 40 knots with gusts up to 74 knots and a low barometric pressure of 988.3 millibars. G2 had been outfitted with sensors to measure water temperature, wind speeds, barometric pressure, and air temperature. The eye of the storm passed 60 miles to the east of G2, which rode out the storm and collected sensor data that provided new insights into hurricane activity. Time-lapsed maps showed a considerable drop in water temperature, suggesting that Isaac was vacuuming heat from the ocean surface.

GLOSSARY

The terms "vessel", "watercraft", and [sea going] "vehicle" are used interchangeably in this disclosure to refer to a nautical craft that can travel across and about any body of water at, near, or below the surface.

A "wave-powered" vessel or device derives at least a majority of its power for locomotion or electricity generation from motion of the water at or about a point of reference. Optionally, the vessel may also derive power from solar energy and other natural sources, and/or man-made sources such as batteries and liquid fuel powered engines. In this context, a "wave" is any upward and downward or side-to-side motion of the water at a point of reference on or near the surface (such as the center of flotation of a vessel).

A "vessel body" or "float" is a component of a vessel that travels on or near the surface of the water. It may have its own source of locomotive power and/or rely on being pulled by a submarine component. When configured to harness wave power, it has an overall density that is lighter than water.

A "swimmer", "pod", "submarine component", "sub", "glider" or "wing rack" is a component of a vessel that travels below the surface of the water and below the vessel body, to which it provides locomotive power or propulsion. The swimmer may be equipped with a plurality of "fins" or "wings" that rotate upwards or downwards around an axle transverse to the direction of travel. Vessels may be configured with one multiple swimmers, typically joined to the same two or more tethers at different depths, each providing locomotive thrust in response to wave action, and optionally configured for nesting when retracted (PCT/US2012/029696). Thus, all the aspects of this invention deriving wave power from a swimmer includes or can be adapted mutatis mutandis to include two, three, or more than three swimmers or wing racks.

An "underwater" vehicle is a vessel designed for traveling under the surface of a body of water to conduct certain activities. It is so classified while actually under the water, when on the surface, or on shore awaiting deployment.

An "extension module" or "endurance extension module" (EXM) is a separate module tethered or otherwise attached to a self-propelling vessel for purposes of providing additional or supplementary propulsion, for providing electricity, or both.

An "unmanned" underwater vehicle, EXM, or other vessel or vessel combination is designed and configured to travel in most circumstances across or through a body without the need of a human on board (whether or not a human is present). Either alone or in combination with modules tethered thereto, it has a self-contained source of locomotive power.

An "autonomous" underwater vehicle, EXM, or other vessel or vessel combination is self-guiding in its operation without needing a human on board or in constant active control at a remote location. Navigation may be controlled by a combination of sensors, electronics, and microprocessors aboard or at a remote location and in wireless communication with the vessel, in combination with periodic or occasional human or remote microprocessor input to set course or mission parameters.

In the context of this disclosure, a "cradle" is a device component configured for securing on or within a UUV on one surface, and configured to receive an EXM on another surface. The cradle may have any shape that is consistent with this function.

For all purposes in the United States of America, each and every publication and patent document cited herein is incorporated herein by reference as if each such publication or document was specifically and individually indicated to be incorporated herein by reference.

While the invention has been described with reference to the specific embodiments, changes can be made and equivalents can be substituted to adapt to a particular context or intended use, thereby achieving benefits of the invention without departing from the scope of what is claimed.

What is claimed is:

1. A vessel configured for operation as an unmanned underwater vehicle (UUV), the vessel comprising:
    (a) a vessel body configured for travel below the surface of a body of water;
    (b) a motor mounted on the vessel body and configured to propel the vessel body under water;
    (c) one or more sensors mounted on the vessel body and configured to conduct measurements in or around an environment in which the UUV is traveling;
    (d) an extension module (EXM) configured for autonomous operation whereby wave motion is mechanically converted to locomotive thrust when the EXM is deployed away from the vessel body;

(e) a cradle mounted on the vessel body that is configured and operable to secure the EXM to the vessel body and to reversibly deploy the EXM away from the vessel body; and (f) one or more tethers connecting the vessel body to the EXM, arranged such that when the vessel body is traveling through and a body of water under the water's surface, and when the EXM is deployed away from the vessel body so as to mechanically convert wave motion to locomotive thrust, the EXM can pull the vessel body through the body of water.

2. A UUV vessel according to claim 1, comprising a docking means configured such that the vessel body and the EXM can reversibly detach from each other when the vessel is deployed in a body of water.

3. A method of reducing power consumption by a UUV vessel according to claim 1 that is traveling through a body of water, the method comprising:

(1) deploying the EXM from the cradle and away from the vessel body;

(2) operating the EXM to pull the vessel body by way of the tether(s); and optionally (3) turning off the motor mounted to the vessel body for some or all of the time that the UUV is being pulled by the EXM.

4. A method of surveying an environment using a UUV vessel according to claim 1 that is traveling through a body of water, the method comprising:

(1) deploying the EXM from the cradle and away from the vessel body; then (2) operating the EXM to pull the vessel body by way of the tether(s); and (3) measuring aspects of the environment within range of the vessel body using the sensors mounted thereto.

5. The method of claim 1, comprising:

(i) disconnecting the vessel body from the EXM after step (2);

(ii) operating the motor such that the vessel body separates from the EXM;

(iii) measuring aspects of the environment according to step (3) while the vessel body is separate from the EXM; then (iv) operating the motor such that the vessel body returns to the EXM; and (v) docking and reconnecting the vessel body with the EXM.

* * * * *